United States Patent [19]

Nagashima

[11] B 4,004,278

[45] Jan. 18, 1977

[54] SYSTEM FOR SWITCHING MULTIPLE VIRTUAL SPACES

[75] Inventor: Shigeo Nagashima, Hachioji, Japan

[73] Assignee: Hitachi, Ltd., Japan

[22] Filed: Mar. 18, 1974

[21] Appl. No.: 452,138

[44] Published under the second Trial Voluntary Protest Program on March 23, 1976 as document No. B 452,138.

[30] Foreign Application Priority Data

Mar. 19, 1973 Japan .............................. 48-30969

[52] U.S. Cl. ............................................ 340/172.5
[51] Int. Cl.² ........................................... G06F 9/20
[58] Field of Search ................................. 340/172.5

[56] References Cited

UNITED STATES PATENTS

| | | | |
|---|---|---|---|
| 3,585,606 | 6/1971 | Evans et al. | 340/172.5 |
| 3,764,996 | 10/1973 | Ross | 340/172.5 |
| 3,800,291 | 3/1974 | Cocke et al. | 340/172.5 |

Primary Examiner—Gareth D. Shaw
Assistant Examiner—Michael C. Sachs
Attorney, Agent, or Firm—Craig & Antonelli

[57] ABSTRACT

In a virtual memory system capable of embodying therein multiple virtual spaces used in a switching mode and having a high speed memory for storing address sets each including a virtual address of the virtual space and a real address of a real space corresponding to the virtual address and indicators for setting the validity or invalidity state of the corresponding address sets, a switching system such that when the multiple virtual spaces are switched, the virtual address in the addressed address set is compared with a special address stored in a register by a comparator, and the indicator corresponding to the addressed address set is set to the invalidity state when the result of comparison fulfills a predetermined condition.

6 Claims, 3 Drawing Figures

SYSTEM FOR SWITCHING MULTIPLE VIRTUAL SPACES

BACKGROUND OF THE INVENTION

The present invention relates to a system for switching multiple virtual spaces adapted to be used with a digital electronic computer of a virtual memory system.

In the virtual memory system a virtual space having a capacity exceeding that of a memory actually provided can be embodied. In contrast to the virtual space, a space realized on a memory is termed a real space.

An address translating table is provided for translating a virtual space to a real space. The address translating table is provided on a memory, with the result that it takes much time if reference is made to the address translating table for each reference to the virtual space.

In this respect, attention is paid to the fact that reference is often made to some concentrated portion of the virtual space if taking into account a short time in carrying out a program. An address set is made of an address of the virtual space, i.e., a virtual address and an address of the real space corresponding thereto, i.e., a real address. Then, the address set to which reference has been lately made is stored on a high speed memory such as a high speed associative memory provided separately from the above-mentioned memory. Thus, reference is made first to the high speed memory, and next to the address translating table if address set corresponding to the referred virtual address can not be found in the high speed memory.

Further, a multiple virtual spaces can be embodied without being restricted to one virtual space, and a plurality of address translating tables are provided which correspond to the respective virtual spaces.

On the other hand, software controlling the digital electronic computer may be divided into a control program, compiler, user program, and the like. In general, the user program is carried out in multi-programming. In this case, the respective user programs are partitioned in a short time and switched (hereinafter referred to as a task switch) for parallel excecution.

The virtual spaces are switched in succession for each task switch in a state where one user program occupies one of the virtual spaces and a plurality of user programs are carried out on multiple virtual spaces in multi-programming. Conventionally, in this case, the address translating tables provided in correspondence with the respective virtual spaces are switched simultaneously with the task switch, and further all the address sets of the virtual and real addresses in the high speed memory provided in common are made invalid. The reason is that the switching of the address translating table otherwise makes nonsense.

Particularly explaining, the above-mentioned high speed memory is controlled as follows:

1. If the address set having the referred virtual address is registered in the high speed memory, then the real address corresponding to the referred virtual address is extracted for prompt reference to the real space.

2. If the address set having the referred virtual address is not registered in the high speed memory, then reference is made to the address translating table to search the corresponding real address so that this address set may be registered in the high speed memory. At this time, if the high speed memory has no place for registration of this new address set because of full registration therein, one of the address sets previously registered therein is erased in accordance with a predetermined algorithm to provide a place for registration of the new address set.

The fact that all of the address sets in the high speed memory are made invalid upon the task switch as mentioned earlier means an increase in the above operation (2). In other words, the reference to the address translation table increases each time of the task switch with the result that much time is required for reference, thereby preventing the high speed operation of the digital electronic computer.

SUMMARY OF THE INVENTION

An object of the present invention is to provide a system for switching multiple virtual spaces to permit high speed operation of a digital electronic computer with less time required for reference.

In order to attain the object, the present invention is intended to make invalid only a certain portion of address sets in the high speed memory upon the task switch.

BRIEF DESCRIPTION OF THE PREFERRED EMBODIMENT

Figure 1:
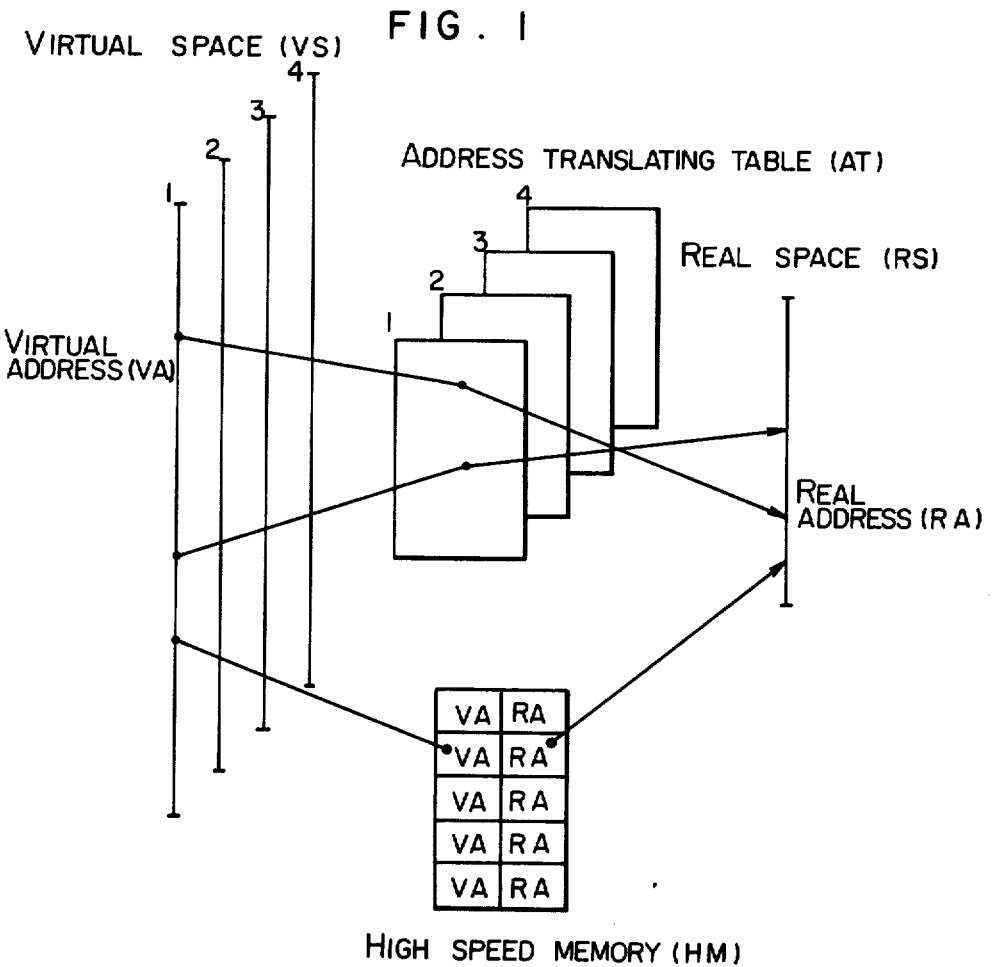
FIG. 1 is an illustrative view of a virtual memory system.

FIG. 1 is a view for illustrating a virtual memory system, in which a virtual space VS exists corresponding to a real space RS realized on a memory actually provided in a digital electronic computer in order to embody a virtual memory having a capacity exceeding that of the actually provided memory.

An address translating table AT is provided for translating the virtual space VS to the real space RS. In addition to the address translating table AT, a high speed memory HM is provided in which virtual addresses VA addressing the virtual space and real addresses RA addressing the real space corresponding thereto are stored in pairs for the purpose of high speed processing.

It will be appreciated that the virtual space VS is not limited to one but a plurality of virtual spaces, for example VS1 to VS4, may be embodied. In this case, address translating tables AT1 – AT4 are provided which correspond to the virtual spaces VS1 to VS4, respectively.

Reference is made first to the high speed memory HM to search the registration of the referred virtual address VA. If the registration of the referred virtual address is searched, the real address RA corresponding to the referred virtual address, VA is extracted to thereby make reference immediately to the real space RS.

If the referred virtual address VA is not registered in the high speed memory HM, then reference is made to the address translating tables AT to search the real address RA corresponding to the referred virtual address, which is then registered with the referred virtual address as an address set in the high speed memory HM.

Upon the task switch, the virtual spaces VS are switched, and the address translating tables AT are also switched corresponding thereto.

Figure 2:
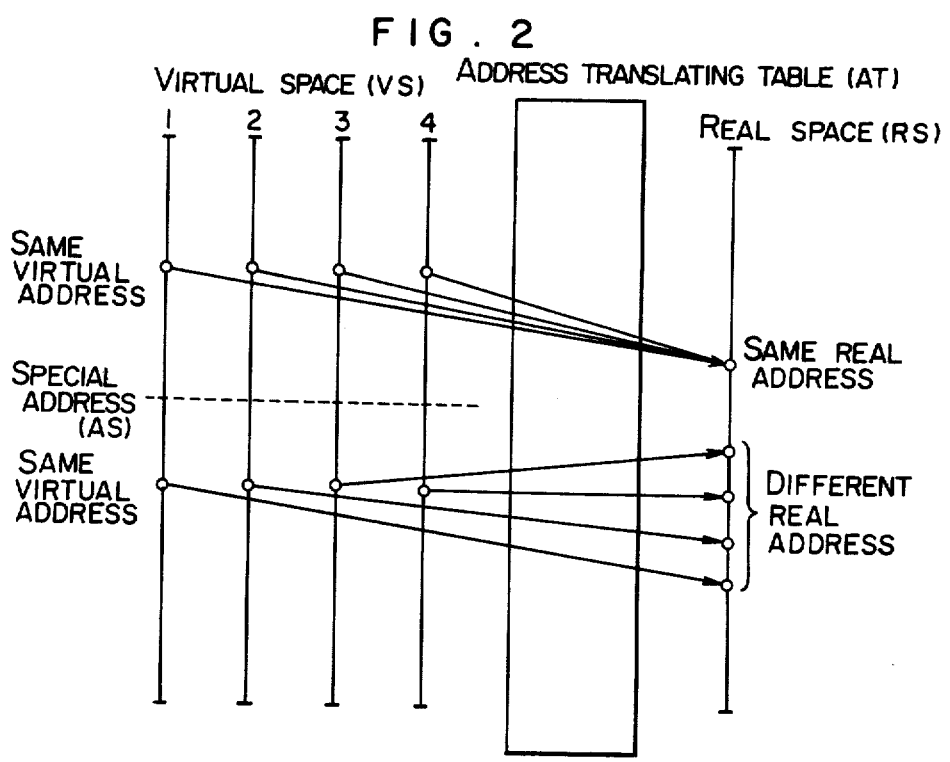
FIG. 2 is an illustrative view of the principle of a multiple virtual space switching system according to the present invention.

FIG. 2 is an illustrative view of the principle of the system according to the present invention.

It is to be noted that also in the embodiment of the virtual spaces VS1 to VS4 as mentioned above the common control program, compiler, and so on are utilized for each of the user programs.

A special address SA forms a boundary which divides the respective virtual spaces VS1 to VS4 into a region over which the same control program and compiler run commonly among all the virtual spaces and a region over which a different user program depending upon each virtual space runs.

At this time, the virtual spaces are divided by this special address SA as shown in FIG. 2 into a region in which the same virtual addresses in the respective virtual spaces are translated to correspond to the same real address and a region in which the same virtual addresses in the respective virtual spaces are, nevertheless, translated to correspond to different real addresses. The present invention is intended to make invalid only the latter region, in carrying out the task switch, while not to make invalid the former region.

In other words, the present invention is intended to make invalid among the address sets registered in the high speed memory, only the address sets having virtual addresses belonging to the latter region in which the same virtual address in the respective virtual spaces correspond to different real addresses when virtual spaces are switched, thereby reducing the number of references to the address translating tables as compared with the prior art in which all of the address sets registered in the high speed memory are made invalid.

Figure 3:
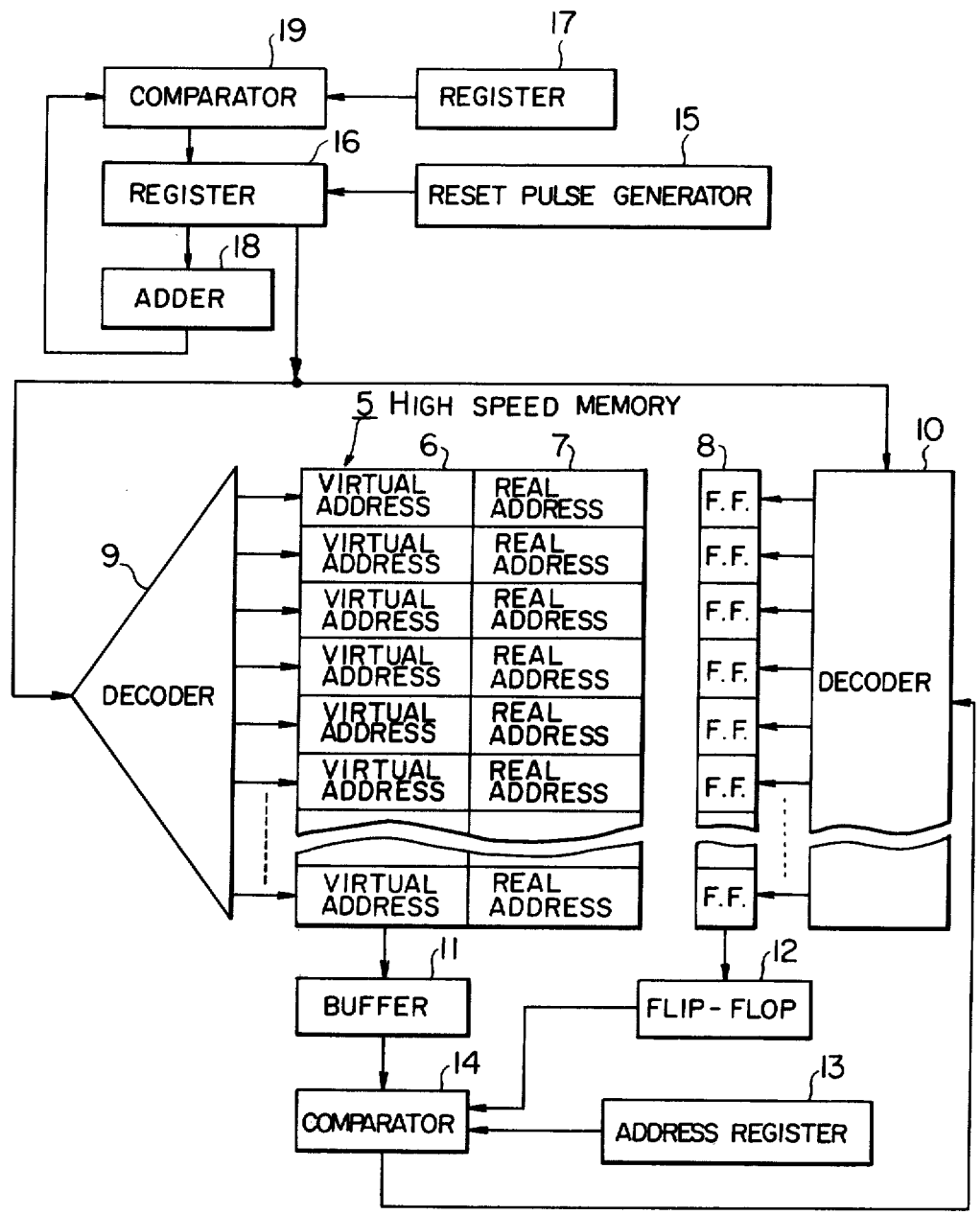
FIG. 3 is a block diagram showing the arrangement of an apparatus embodying a system according to the present invention.

FIG. 3 shows the arrangement of an apparatus embodying the system of the present invention shown in FIG. 2.

The apparatus comprises a high speed memory 5 which is provided with a plurality of address sets each including a region 6 for registering a virtual address and a region 7 for registering a real address corresponding thereto, and flip-flops 8 provided correspondingly to the respective address sets in the high speed memory 5 for indicating the validity or invalidity of the corresponding address sets. In this arrangement each of the flip-flops takes the state "1" to indicate the validity of the associated address set and the state "0" to indicate the invalidity of same.

The apparatus further comprises decoders 9 and 10, a buffer 11 for storing the virtual address region 6 of the address set addressed by the decoder 9, a flip-flop 12 for storing the content of the flip-flop addressed by the decoder 10, an address register 13 for registering a special address, and a comparator 14 for comparing the virtual address in the buffer 11 with the address in the address register 13 so as to generate an indication signal when the result of comparison by the comparator 14 agrees with a given criterion and at the same time the content of the flip-flop 12 indicates "1".

The apparatus further comprises a reset pulse generator 15, a register 16 for addressing a predetermined address set in the high speed memory 5, a register 17 for indicating the number of address sets permitted to be registered, an adder 18 for adding one to the content of the register 16, thereby generating an output increasing by one the content of the register 16, and a comparator 19 for comparing the output from the adder 18 with the content of the register 17 to transmit the output of the adder 18 to the register 16 until the output of the adder 18 coincides with the content of the register 17.

Various kinds of arrangements of the high speed memory may be proposed but the arrangement as shown in FIG. 3 is illustrated for the purpose of simplicity of the description.

The description will next be made of operations required for effecting the task switch in connection with the apparatus shown in FIG. 3.

1. The reset pulse generator 15 instructs the resetting of the register 16 to turn the content thereof to be zero. The register 16 serves to address the number of the region in which the address set is stored in the high speed memory 5.

2. The number (herein it is zero) indicated by the register 16 is transmitted to the decoder 9 and decoded to address the place in which the address set corresponding to the indicated number is stored in the high speed memory 5.

3. The virtual address of the address set at the addressed place is read out and stored in the buffer 11.

4. At the same time, the number indicated by the register 16 is also transmitted to the decoder 10 so that the content of the flip-flop 8 corresponding to the indicated number is read out and stored in the flip-flop 12.

5. The content of the buffer 11, that is, the virtual address therein is compared with the special address in the address register 13 by means of the comparator 14 according to the given criterion (for example, such a criterion that the virtual address in the buffer 11 be greater than the special address in the address register 13). Only under the conditions that the result of the comparison by the comparator 14 fulfils the criterion and at the same time the content of the flip-flop 12 is "1", the decoder 10 receives a signal which instructs it to render the content of the flip-flop 8 corresponding to the number indicated by the register 16 to be "o", that is, render the corresponding address set invalid.

6. The decoder 10 renders the content of the flip-flop 8 corresponding to the number indicated by the register 16 to be "0". Thus, the corresponding address set is made invalid.

7. The content of the register 16 is increased by one by means of the adder 18 so as to be applied to the comparator 19 to be compared with the number registered in the register 17 which indicates the number of address sets permitted to be registered in the high speed memory 5, and then the content of the adder 18 continues to be applied to the register 16 until it becomes equal to the number registered in the register 17. Thereafter, the operations (2) to (6) are repeated.

In brief, the feature of the embodiment shown in FIG. 3 according to the present invention is in that a register for registering a special address and a comparator are provided so that the special address in the register is compared with the virtual address extracted from a certain address set in a high speed memory by means of the comparator to thereby make the certain address set invalid only when the virtual address of the certain address set exists in a predetermined range.

Although in the embodiment of FIG. 2 one special address forms a boundary between two regions, in one of which the same virtual addresses of the respective virtual spaces are translated to correspond to the same real address and in the other of which they are translated to correspond to different real addresses, another embodiment can be provided in which a plurality of special addresses divide the respective virtual spaces into a plurality of regions consisting of a plurality of the same regions as the above-mentioned one region and a plurality of the same regions as the above-mentioned other region alternately. In this case, a plurality of address registers 13 are combined with one another to make it possible to render invalid only the address sets within a predetermined region or conversely make invalid the address sets outside of the region.

Further, it is preferable that the content of the address register 13 is not kept constant but it can be varied in response to an instruction.

Further, the virtual address 6 in the high speed memory 5 and the content of the flip-flop 8 may be applied directly to the comparator 14 without through the buffer 11 and the flip-flop 12.

Further, the components (15 to 19 in FIG. 3) for producing the number which addresses the address set in the high speed memory 5 are illustrated as a mere example and many modifications may be proposed.

It will further be appreciated that in order to embody the principle of the present invention illustrated in FIG. 2 many modifications can be proposed without being restricted to the embodiment of FIG. 3.

As mentioned above, the present invention permits the time required for reference to be reduced and the digital electronic computer to be operated at a high speed by making invalid only the special address sets in the high speed memory in carrying out the task switch.

I claim:

1. In a virtual memory system having a real space and multiple virtual spaces used in a switching mode and comprising a high speed memory for storing a plurality of address sets each including a virtual address of said virtual space and a real address of said real space corresponding to the virtual address, indicator means provided in correspondence with respective address sets in said high speed memory for indicating one of the validity and invalidity states of the corresponding address sets and extracting means connected to said high speed memory for extracting the real address corresponding to the referred virtual address from said high speed memory;

a system for switching said virtual spaces including:
addressing means connected to said high speed memory for addressing in succession the address sets in said high speed memory;
first register means for storing at least one special address;
comparing means connected to said high speed memory and said first register means for comparing the virtual address in the address set addressed by said addressing means with the special address in said first register means so as to generate an indication signal when the virtual address in the addressed address set belongs to a region delimited by the special address in which the same virtual addresses in the respective virtual spaces are translated to correspond to different real addresses; and
setting means connected to said comparing means and said indicator means for setting the invalidity state of the addressed address set to the corresponding indicator means in accordance with the indication signal from said comparing means.

2. A system for switching multiple virtual spaces according to claim 1, further comprising second register means, connected to said high speed memory and said comparing means, for temporarily storing the virtual address in the addressed address set.

3. A system for switching multiple virtual spaces according to claim 1, in which said comparing means including means for generating said indication signal when the virtual address in the addressed address set is within a region delimited by the special address, in which the same virtual addresses in the respective virtual spaces are translated to correspond to different real addresses and when the validity state of the indicator means corresponds to the addressed address set.

4. A system for switching multiple virtual spaces according to claim 3, further comprising second register means, connected to said indicator means and said comparing means, for temporarily storing the content of said indicator means corresponding to the addressed address set.

5. A system for switching multiple virtual spaces according to claim 1, wherein said addressing means comprises a first address register for storing an address for addressing a certain address set in said high speed memory, a reset pulse generator connected to said first address register for resetting said first address register, an adder connected to said first address register for adding one to the address number of said first address register, thereby generating an output which is the address number increased by one of the address number of said first register, a second address register for indicating the total number of the address sets in said high speed memory, a comparator connected to said adder and said second address register for comparing the output from said adder with the content of said second register, and transmitting means connected to said comparator and said first register for transmitting the output of said adder to said first address register unless the comparison indicates a coincidence.

6. In a virtual memory system having a real space and multiple virtual spaces used in a switching mode and comprising a high speed memory for storing a plurality of address sets each including a virtual address of said virtual space and a real address of said real space corresponding to the virtual address, indicator means provided in correspondence with the respective address sets in said high speed memory for indicating one of the validity and invalidity states of the corresponding address sets and extracting means connected to said high speed memory for extracting real address corresponding to the referred virtual address from said high speed memory, a system for switching said virtual spaces comprising:
a first register for storing an address number for addressing a certain address set in said high speed memory;
a reset pulse generator connected to said first register for resetting said first register;
an adder connected to said first register for adding one to the address number of said first register, thereby generating an output which is the address number increased by one of the address number of said first register;
a second register for indicating the total number of the address sets in said high speed memory;
a comparator connected to said adder and said second register for comparing the output of said adder with the content of said second register;

transmitting means connected to said comparator and said first register for transmitting the output of said adder to said first register unless the comparison indicates a coincidence;

a first decoder connected to said first register and said high speed memory for decoding the address number of said first register for selecting a certain address set in said high speed memory;

a second decoder connected to said first register and said indicator means for decoding the address number of said first register for selecting a certain indicator means;

a buffer connected to said high speed memory for storing the virtual address of the address set read out from said high speed memory in response to a selection of said first decoder;

a flip-flop connected to said indicator means for storing the content delivered from said indicator means in response to a selection of said second decoder;

a third register for storing at least one special address;

a second comparator, connected to said buffer, said flip-flop and said third register, for comparing the virtual address in said buffer with the address in said third register so as to generate an output signal when the virtual address in the selected address set is within a region delimited by the address in said third register, in which the same virtual addresses in the respective virtual spaces are translated to correspond to different real addresses and when the validity state is stored in said flip-flop;

and setting means connected to said second comparator and said indicator means for setting the invalidity state of the addressed address set to the corresponding indicator means selected by said second decoder.

* * * * *